Feb. 18, 1930. C. W. BHOSYS 1,747,416
APPARATUS FOR LIGHTING PHOTOGRAPHIC SUBJECTS
Original Filed June 22, 1922   3 Sheets-Sheet 1

Inventor
Charles W. Bhosys
by Guido M. Sacerdote
Attorney

Patented Feb. 18, 1930

1,747,416

UNITED STATES PATENT OFFICE

CHARLES WILLIAM BHOSYS, OF NEW YORK, N. Y.

APPARATUS FOR LIGHTING PHOTOGRAPHIC SUBJECTS

Substitute for application Serial No. 570,272, filed June 22, 1922. This application filed January 10, 1927. Serial No. 160,316.

This invention relates to apparatus for directing and controlling light to be thrown upon photographic subjects, and more particularly refers to a portable device which may be used both for generating and for controlling the distribution of light to be used for photographic purposes.

The primary object of this invention is to provide an appartus for lighting photograph10 ic subjects adapted for use both in photographing live or still subjects and in making reproductions of pictures and prints, so as to place at the disposal of the average photographer a simple and practical device adapted for use in connection with a wide range and variety of photographic work.

Another object is to provide an apparatus for lighting photographic subjects, adapted for use both in photographing live or still subjects and in making reproductions of pictures and prints, said apparatus being of a portable character and adapted to be produced at a relatively moderate cost.

Other objects and advantages of the present invention will more fully appear as the description proceeds and will be set forth and claimed in the appended claims.

This application is a substitute of application No. 570,272, filed June 22, 1922, and is to a certain extent related to the subject matter of another patent for Apparatus for making photographic reproductions granted to me Sept. 21, 1926, No. 1,600,709.

In the annexed drawings, I illustrate a type of apparatus combining in a single device the possibility of lighting subjects to be photographed as well as the possibility of lighting and displaying pictures or prints to be reproduced, these being branches of the photo40 graphic art of a distinct and separate nature.

Figures 1, 2:
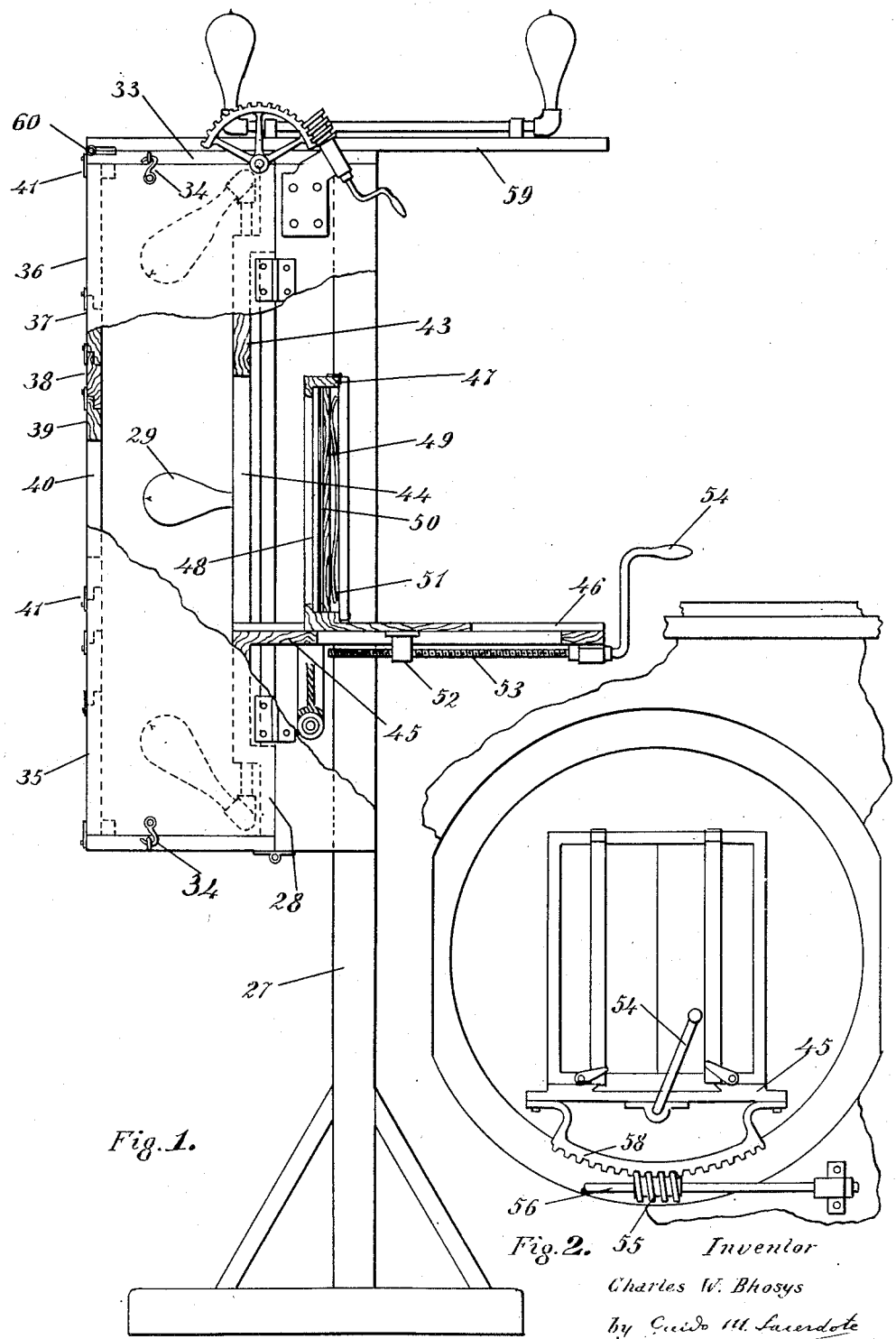
Fig. 1 is a side view in elevation partly sectioned of an apparatus embodying my invention suitable both for lighting subjects to be photographed and for lighting subjects to be reproduced.
Fig. 2 is a detail rear view in elevation illustrating the means of adjusting the clamping frame of the apparatus shown in Fig. 1.
Figure 3:
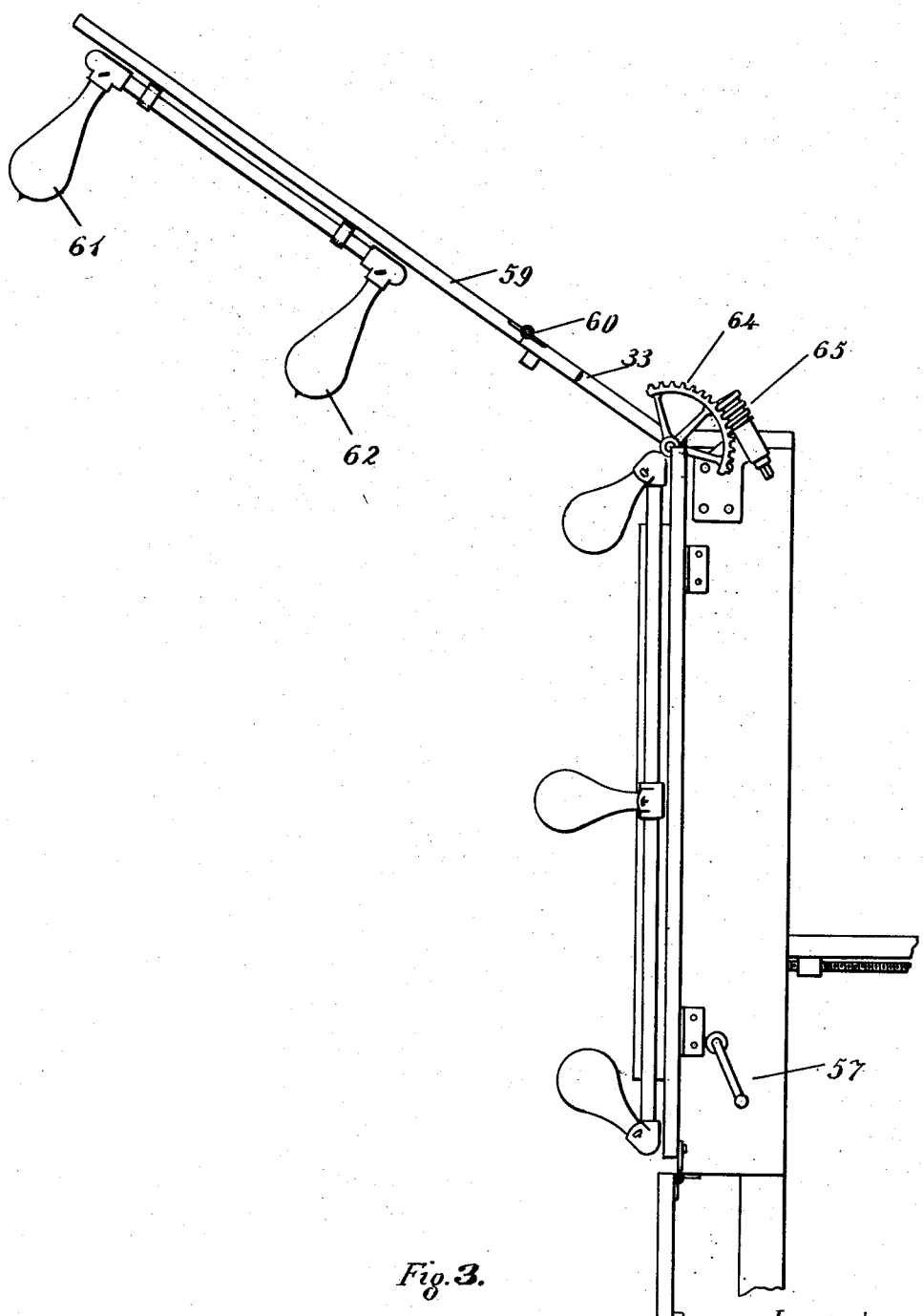
Figure 4:
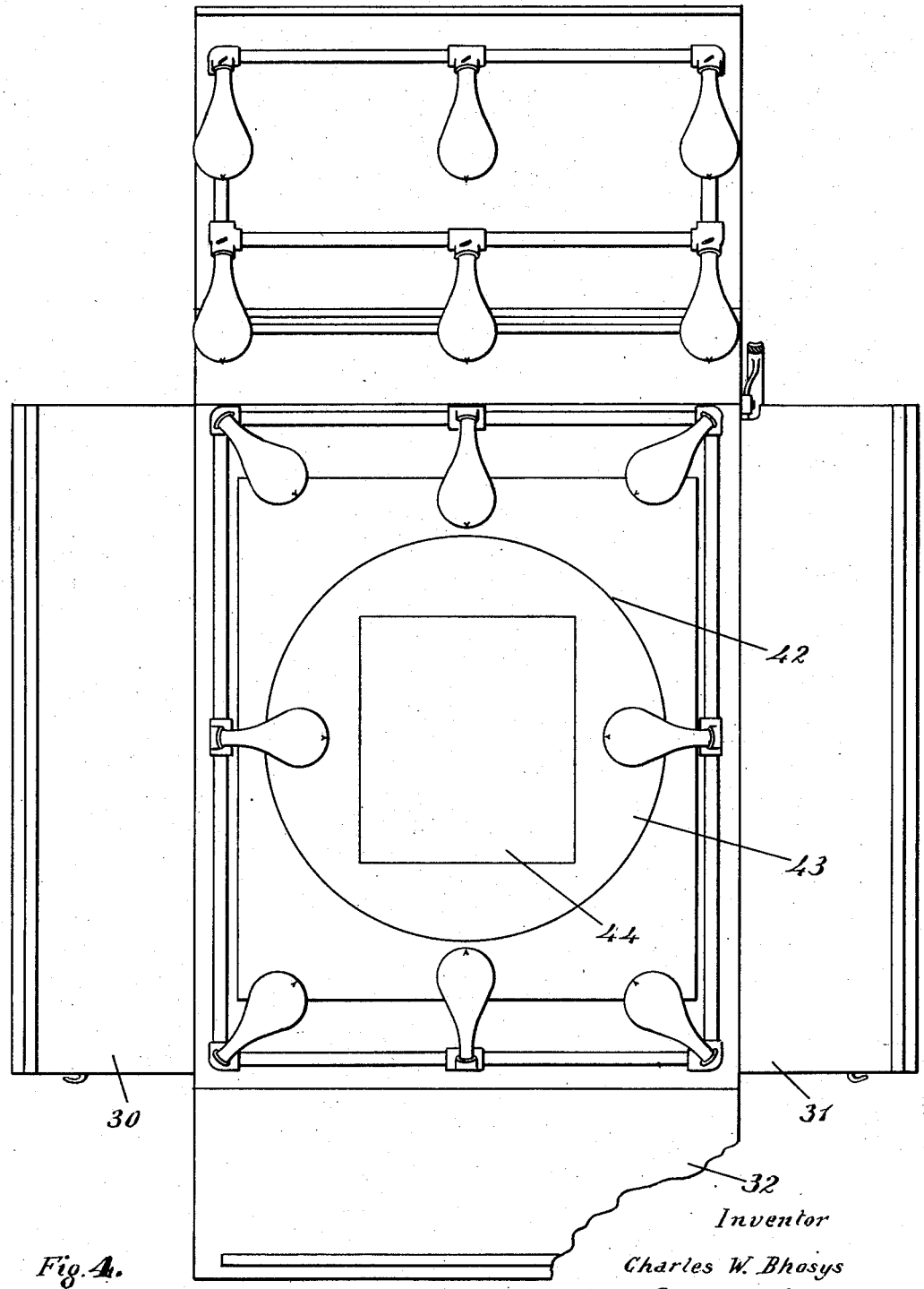

Fig. 3 is a side view in elevation partly broken away of the apparatus shown in Fig. 1, set for lighting the subject or subjects to be photographed; and Fig. 4 is a front view in elevation partly broken away of the same.

One of the features of my invention resides in the possibility of providing an intense illumination adapted to be adjustably distributed upon a subject to be photographed, by means of an apparatus of simple design, preferably of a portable and inexpensive character.

The use of artificial light for taking pictures in photographic studios generally entails the necessity of making expensive installations as well as the employment of powerful lamps. By using a number of bulbs of relatively moderate intensity, suitably distributed upon a board or combination of boards, of a portable and adjustable nature, I am able to produce an apparatus of relatively inexpensive construction occupying a very small space and adapted to be placed at any point in the studio to best advantage; so that the device only may be used for the illumination of a subject or the same may be so placed that it will cooperate with the daylight available in properly illuminating said subject.

In order to enlarge the field of application of my device, so that its usefulness may be considerably increased, by means of a special construction thereof, I produce an apparatus comprising means such as described and claimed in my patent above referred to, whereby the device may be used for making reproductions of pictures or prints; said apparatus being so constructed that it may readily be changed into a lighting device adapted for illuminating subjects to be photographed enabling the photographer to produce high grade work of all kinds, and to save valuable space by employing a single apparatus of a relatively simple construction and moderate in cost.

This improved apparatus is illustrated in Figs. 1 to 4, where 27 designates a stand, preferably portable, carrying a panel 28, on which are mounted a plurality of photographic bulbs 29 arranged in rectangular series close to the periphery of the panel. Said bulbs are inwardly inclined, from the plane of panel 28, to converge towards the space in front of the central portion of said panel.

The vertical panel is provided with two sides 30, 31, a bottom 32 and a top 33 hinged to said panel, which may be folded inwardly to form a boxlike structure adapted to surround said panel and electric bulbs, as shown. Said structure may be maintained in its closed position in any suitable manner for instance, by means of hook and eye connection 34. The front part of the box structure is constituted by a panel 35, which is preferably of a sectional construction comprising interlocking sections 36, 37, 38, 39, fitting one inside of the other, so as to make the opening in said front panel adjustable by steps according to the size of the picture to be reproduced, section 39 being provided with the smallest opening 40. Said panel sections may be secured in any convenient manner for instance, by means of clip 41.

Pictures to be reproduced may be mounted on panel 28 in any convenient manner; but it is well that means be provided for insuring exposure of the pictures in a perfectly flat condition, and that means be also provided for adjustment of said pictures in a vertical and a horizontal plane. The adjustment in a vertical plane, makes it easy to place the picture to be reproduced in line with the opening in the front panel, and the adjustment in a horizontal plane provides means adjusting the capacity of the light directed against the picture and also the angle at which the rays of light issuing from the sides of the bulbs strike the picture and the glass plate against which the picture is held.

In order to achieve these results, I provide panel 28 with a central circular opening 42, in which is inserted and retained circular panel 43, so as to be rotatable around its center in a vertical plane. Said panel 43 is provided with a central rectangular opening 44, and is integral with an apron 45 horizontally extending towards the rear, formed with a dovetailed slot 46 from front to rear. In said slot is slidably inserted a clamping frame 47, of the ordinary type used for printing copies from negatives; said clamping frame being provided with a glass panel 48 and a foldable block 49 maintaining the picture 50 to be reproduced flat against the surface of glass 48 by means of pressure exerted by springs 51.

The lower portion of said clamping frame is provided with a lug 52, into which is inserted a screw 53, operated by a crank lever 54; and by means of the same, the clamping frame may be caused to move towards or away from the front of panel 28, thus exposing picture 50 to a more or less intense illumination.

The adjustment of panel 43, and consequently of picture 50 in a vertical plane, may be effected by hand; but in order to insure stability of the system, I prefer to effect the same by means of a worm 55 carried by a shaft 56 operated by means of crank lever 57, said worm being in mesh with a worm segment 58 attached to apron 45. In practice an adjustment of about sixty degrees, as made possible by the worm segment shown, will be quite sufficient, since it is possible to clamp the picture in frame 47 at the center, and practically in the right position at the start; the adjustment being used only for the correction of small errors.

If a picture of large dimensions should have to be reproduced, beyond the capacity of frame 47 to hold, it is, of course, possible to hold the same against the front surface of panels 28, 43, by means of a suitable glass panel secured to the same in any convenient manner.

For the purpose of using the apparatus for lighting subjects to be photographed, I provide an additional upper panel 59 hinged at 60 to top 33, which upper panel may be folded to the rear as shown in Fig. 1, when the apparatus is used for reproduction work; on the other hand, said upper panel will be in alignment with top 33 when unfolded and extended to the front as shown in Figs. 3, 4.

Said panel carries two rows of bulbs 61, 62, which are mounted at right angle to the panel, but which will be inclined towards the front of the subject when panel 59 is inclined upwardly as shown in Figs. 3, 4. Top 33 is mounted on a shaft 63 carrying a worm segment 64, which may be operated by means of a worm 65, so that top 33, and with it panel 59 may be set at any desired angle.

By opening the sides 30, 31, and the bottom 32 of the box-like structure used for making reproductions, as shown in Figs. 3, 4, the apparatus is made ready for use in connection with the taking of pictures.

The rays of light emitted from the sides of bulbs 29 strike panel 28 at an angle and are reflected thereby in a practically horizontal direction; so that a subject to be photographed placed beside the panel will be exposed to both the light directly issuing from the bulbs and to the light reflected by the panel.

At the same time sides 30, 31, being pivotally mounted may also be set in any desired position to reflect the light issuing from bulbs 29 at different angles, thus providing means for regulating the light directed upon the subject to be photographed, both as to intensity and as to direction of the reflected rays.

Bulbs 61, 62, carried by upper panel 59 will direct rays of light forward, according to the inclination of the panel and the panel itself will intensify the illumination thus produced by reflecting the light emitted by the bulbs.

In this manner a beam of light is thrown downwardly ahead of the device so as for instance to illuminate various persons to be photographed in a group, independently of one another. When the apparatus is used as a device for lighting subjects to be photographed, it is placed at one side of the subject or subjects; so that the horizontally directed rays issuing from panel 28 and its sides 30, 31, will produce a depth illumination of the subjects due to the fact that the light reflected by the vertical side ahead of the subject or subjects will strike said subject or subjects at an angle; and in a similar manner, the inclined panel above will throw a beam of light in an inclined direction reaching all the members of the group.

In this manner, the possibility of one member of the group obstructing the light from another adjoining is entirely avoided. The light issuing from panel 59 is also extremely useful in setting in evidence, details of a subject such as a person or a piece of sculpture and the like which would be lost if side illumination only were used; this advantage is also of great value in the field of commercial photography where every detail of the photographed objects must be made apparent.

By adjusting the inclination of panel 59 as well as the inclination of the sides 30, 31 and by separately controlling the various bulbs, an infinite variety of lighting effects may be produced, which enable the photographer to turn out his work to the best advantage. The proper control of light is one of the essentials in modern photography if pictures of a high artistic value are to be produced, and heretofore this factor has been the chief difficulty confronting the operators in photographic studios.

The necessity of providing ample illumination and a flexible and thorough control thereof, had led to the adoption of expensive installations which are beyond the reach of the average studio of moderate size; my present invention makes it possible to obtain all the desired advantages permitting the production of the highest grade of work at comparatively small expense.

As a general rule, when artificial light is used in a photographic studio, the same is not projected directly upon the subject but is controlled and reflected by means of reflectors or screens, the main object of which is usually to create a diffuse light effect in order to avoid sharp reliefs and high lights in the picture.

It has been my experience however, that while light thus reflected and diffused improves to a certain extent, the relative tone values of a picture, the necessary intensity of illumination is usually lacking, so that the work produced is not as good as would be obtained by daylight.

It is therefore of the utmost importance that the reflected light effect be retained but at the same time it is equally important that the full intensity of the light available be utilized.

By combining as I do, the direct light obtainable from the bulbs with the light reflected by the screens or panels, I obtain a light which is both powerful and mellow, providing an ideal condition for the taking of pictures by artificial light. Moreover, the light is easily controllable both on account of the individual control of the bulbs and on account of the gradual control of the inclination of the upper panel made possible by the gear operating mechanism illustrated.

My apparatus may therefore be used in conjunction with all classes of work; thereby solving practically every lighting problem confronting the average photographer without entailing the necessity of making expensive permanent installations.

From the foregoing it is seen that my apparatus represents a decided improvement in the photographic art, in providing as it does means for using artificial light to the best advantage both for taking and for reproducing pictures.

It is obvious that my invention may be altered in its various details without substantially departing from the inventive idea, and accordingly the drawings will be understood as being intended for illustrative purposes only and not in a limiting sense. Therefore, I reserve myself the right to carry my invention into practice in any way or manner which may enter fairly into the scope of the appended claims.

I claim:

1. Apparatus for lighting photographic subjects, comprising a stand, a vertical panel having picture holding means mounted thereon, another panel mounted at the top of the same movable around a horizontal axis, a plurality of electric bulbs carried by both panels, and means for adjusting the inclination of said movable panel.

2. Apparatus for lighting photographic subjects, comprising a stand, a vertical panel mounted thereon, another panel mounted at the top of the same movable around a horizontal axis, the front part of said panel being foldable upon its rear part, two sides and a bottom hinged to said vertical panel adapted to form a box-like structure around the same together with said rear top panel part, lighting means carried by said panels, and adjustable picture holding means carried by said vertical panel.

3. Apparatus for lighting photographic subjects, comprising a stand, a vertical panel mounted thereon, another panel mounted at the top of said panel being foldable upon its rear part, two sides and a bottom hinged to said vertical panel adapted to form a box-like structure around the same together with said rear top panel part, lighting means carried by said panel, and means for closing the front part of said box-like structure, said means having an opening sufficient to expose a picture held by said picture holding means.

4. Apparatus for lighting photographic subjects, comprising a stand, a vertical panel mounted thereon, another panel mounted at the top of the same movable around a horizontal axis, two sides and a bottom adapted to form a box-like structure around said vertical panel together with said top panel, lighting means carried by said panels, picture holding means carried by said vertical panel, means for closing the front part of said box-like structure having an opening adapted to expose a picture held by said picture holding means, and means for adjusting the inclination of said top panel.

5. Apparatus for lighting photographic subjects, comprising a stand, a vertical panel mounted thereon, lighting means movably associated with and carried by said panel, means adapted to surround said panel forming a box-like structure therewith, picture holding means carried by said panel and means for closing the front part of said box-like structure, having an opening adapted to expose a picture held by said picture holding means.

CHARLES WILLIAM BHOSYS.